(12) United States Patent
Wilson

(10) Patent No.: US 8,327,550 B2
(45) Date of Patent: Dec. 11, 2012

(54) BLADE CLAMP FOR RECIPROCATING SAW

(75) Inventor: Mike Wilson, Crook (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 13/016,191

(22) Filed: Jan. 28, 2011

(65) Prior Publication Data

US 2011/0131819 A1 Jun. 9, 2011

Related U.S. Application Data

(62) Division of application No. 10/975,063, filed on Oct. 26, 2004, now abandoned.

(30) Foreign Application Priority Data

Oct. 28, 2003 (GB) .................................. 0325077.6

(51) Int. Cl.
*B27B 19/02* (2006.01)
*B23B 31/10* (2006.01)

(52) U.S. Cl. ................ 30/392; 30/338; 30/339; 30/394; 83/698.31; 83/699.21; 279/77

(58) Field of Classification Search ............... 83/698.21, 83/698.72, 699.21, 697.71, 698.1, 697.713; 30/392–394, 337–339; 279/76, 77
See application file for complete search history.

(56) References Cited

U.S. PATENT DOCUMENTS

| | | | | |
|---|---|---|---|---|
| 3,583,716 A | * | 6/1971 | Daniel, Jr. ........................ | 279/81 |
| 5,322,302 A | * | 6/1994 | Quirijnen ......................... | 279/22 |
| 5,573,255 A | * | 11/1996 | Salpaka ........................... | 279/75 |
| 5,987,758 A | * | 11/1999 | McCurry et al. ................ | 30/392 |

FOREIGN PATENT DOCUMENTS

| DE | 4313718 | * 11/1994 |
|---|---|---|
| JP | 10-315201 | * 12/1998 |

OTHER PUBLICATIONS

JP10-315201 Translation Dec. 1998; Mimori, T.*

* cited by examiner

*Primary Examiner* — Laura M. Lee
(74) *Attorney, Agent, or Firm* — Kofi Schulterbrandt; Scott B. Markow; Adan Ayala

(57) ABSTRACT

A jigsaw drive shaft is connected to a blade by the blade clamp of the present invention. The blade clamp comprises a clamp body mounted securely to the drive shaft by a bracket. The clamp body has a hollow portion formed to receive an upper portion the jigsaw blade. The clamp body also includes a hollow tubular extension. A cam body is pivotable about an axis through a cylindrical bore such that cam surfaces move in and out of contact with an interior surface of the clamp body to engage or release the blade. A spring biases the cam body into engagement with the clamp body surface. The user must press on a protrusion of the cam body to pivot the cam surfaces way from the clamp surface and against the force of the spring.

16 Claims, 9 Drawing Sheets

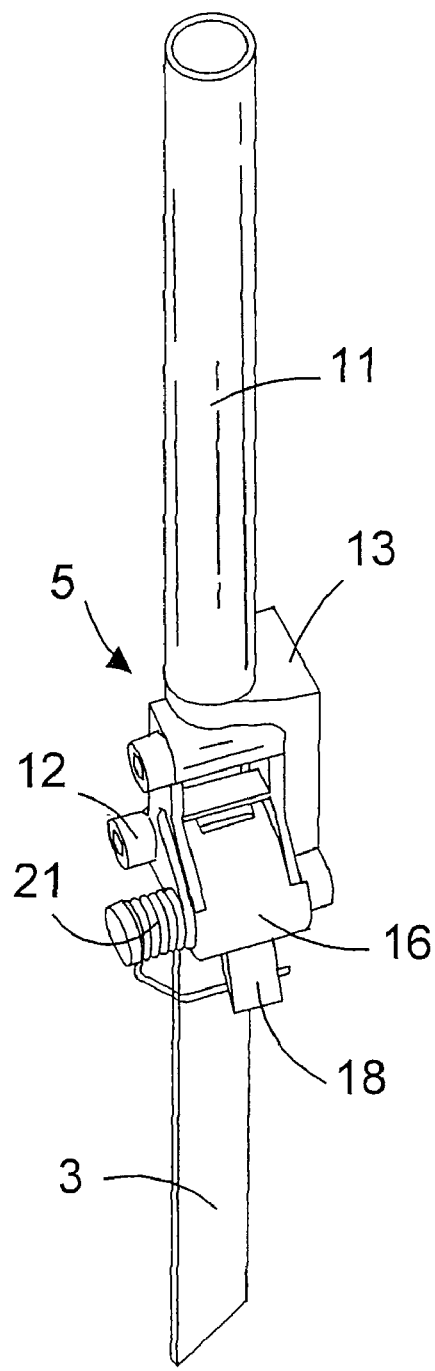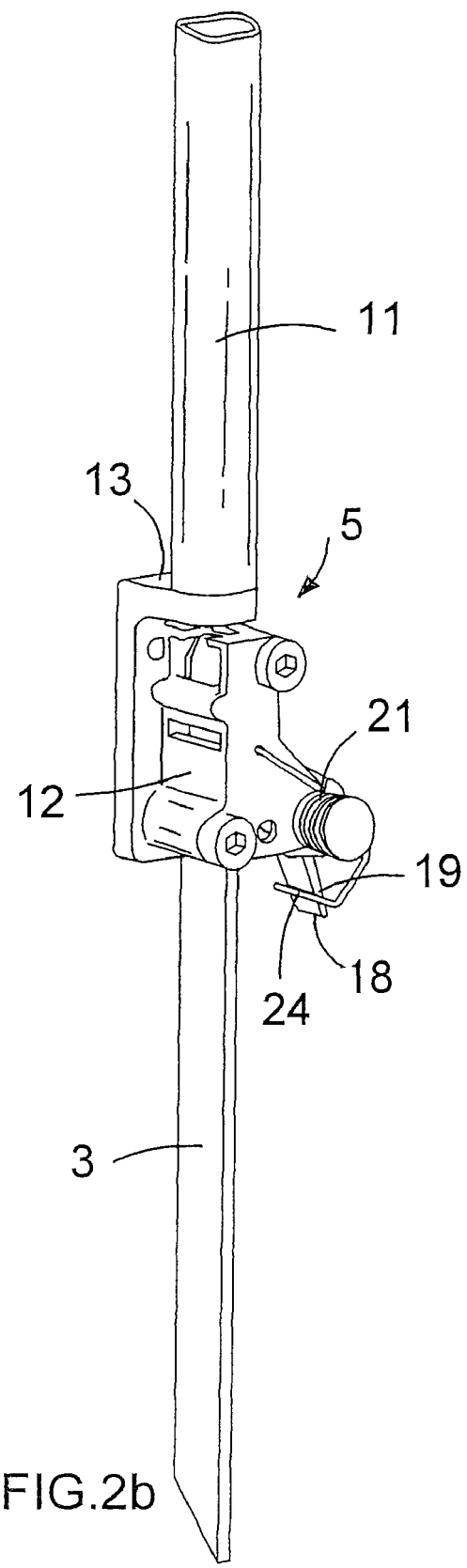
FIG.2a
FIG.2b

BLADE CLAMP FOR RECIPROCATING SAW

FIELD OF THE INVENTION

The present invention relates to a clamp assembly for a working member of a reciprocating tool and relates particularly, but not exclusively, to a clamp assembly for the blade of a reciprocating jigsaw.

BACKGROUND OF THE INVENTION

Jigsaws are power tools which comprise a reciprocating saw blade for cutting a work piece of wood or other material. Most jigsaws comprise a plastic housing containing an electric motor. The rotary output of the motor is geared to a drive conversion mechanism which converts rotary motion of the motor output into reciprocating motion of an output shaft to cause reciprocating motion of a saw blade.

Jigsaws are usually designed to enable the blade to be removed from the output shaft. This serves two purposes. Firstly, due to the high frictional forces encountered when in use, jigsaw blades are subject to wear and tear and have limited lifetimes, so that there is a necessity to enable the blade to be easily replaced. Secondly, several different types of blade may be supplied with the jigsaw to enable it to be used to cut a variety of different types of workpiece, or cut the workpiece in a variety of ways.

European Patent Application EP0792713 describes a jigsaw blade clamp which comprises a channel formed in a jigsaw output shaft shaped to accommodate a jigsaw blade and a pin that is urged into contact with the blade by a spring, such that the pin forces the blade into the channel thereby holding it in place. This prior art clamp suffers from the drawback that if sufficient force is applied to the blade, it can still slip out of place and even be pulled away from the jigsaw.

Preferred embodiments of the present invention seek to overcome the above disadvantage of the prior art.

BRIEF SUMMARY OF THE INVENTION

According to an aspect of the present invention, there is provided a clamp assembly for removably mounting a working member of a reciprocating tool to a reciprocating output shaft, the assembly comprising:

a body member adapted to be mounted to said output shaft;

at least one engaging member having at least one first engaging portion adapted to be located at least partially in front of a respective second engaging portion on said working member in the direction of reciprocation of the working member, wherein said engaging member is pivotable in use relative to said body member between a first position, in which said first engaging portion engages said second engaging portion to retain the working member in position on the output shaft, and a second position in which the working member is removable from the output shaft; and first biasing means for urging said engaging member towards said first position;

wherein application of a force to said working member tending to remove the working member from the body member when at least one said engaging member is in a first position thereof causes movement of at least one said second engaging portion to be prevented by the corresponding said first engaging portion.

By providing a clamp assembly in which at least one first engaging portion of an engaging member is adapted to be located partially front of a respective second engaging portion on the working member (in the direction of reciprocation of the working member), this provides the advantage that the working member can be more effectively held in position on the tool than a clamp assembly using friction alone.

The assembly may comprise a plurality of said first engaging portions, wherein at least one said first engaging portion is capable of limited pivotal movement relative to at least one other said first engaging portion.

This provides the advantage of minimising the risk that only one side of an engaging member correctly holds the working member in position, for example as a result of manufacturing tolerances.

In a preferred embodiment, the assembly comprises a plurality of said engaging members, wherein at least one said engaging member is capable of limited pivotal movement relative to at least one other said engaging member about a common axis.

The assembly may comprise at least one first said engaging member having a respective protrusion, and at least one corresponding second said engaging member having a respective recess for receiving at least one respective said protrusion, wherein at least one said recess permits limited pivotal movement of the corresponding said protrusion therein such that the corresponding said first engaging member is pivotable about said common axis.

This provides the advantage that manufacturing tolerances can be accommodated by enabling a plurality of the engaging members to be pivotable about a common axis relative to each other, while enabling pivoting of a single engaging member by a user to cause pivoting of more than one engaging member.

In a preferred embodiment, at least one said engaging member further comprises at least one elongate protrusion adapted to enable the user to pivot said engaging means towards said second position.

This provides the advantage that it is made easier for the user to release the blade from the clamp by minimising the force which the user needs to apply to the engaging member because of leverage obtained by the elongate protrusion.

At least one said elongate protrusion may be formed on a corresponding said first engaging member.

Said first biasing means may comprise at least one torsional spring adapted to engage at least one said elongate protrusion and said body member.

In a preferred embodiment, at least one said first engaging portion comprises at least one respective cam surface for engaging the working member wherein application of a force to said working member so as to remove the working member from the output shaft urges at least one said cam surface further into engagement with said working member.

This provides the advantage that if the working member is pulled outwardly of the tool, the grip provided by the clamp on the working member is tightened.

The or each said engaging member may be adapted to be displaced from the first position thereof by movement of the working member towards the output shaft to enable mounting of the working member to the assembly by such movement thereof.

According to another aspect of the present invention, there is provided a reciprocating tool comprising:

a body;

a motor having a rotary shaft;

drive means for converting rotary movement of said rotary shaft to reciprocating movement of an output shaft; and a clamp assembly as defined above.

In a preferred embodiment, the tool comprises a jigsaw.

The tool may further comprise at least one working member having at least one second engaging portion for engaging at least one corresponding said first engaging portion.

At least one said second engaging portion may comprise at least one respective slot.

In a preferred embodiment, said working member is a saw blade and at least one said second engaging portion is provided in an edge of the blade.

The tool may further comprise second biasing means for urging said working member out of engagement with said output shaft.

This provides the advantage of facilitating removal of the working member from the tool, as well as providing an indication whether the working member is correctly mounted to the tool.

BRIEF DESCRIPTION OF THE DRAWINGS

Preferred embodiments of the present invention will now be described, by way of example only and not in any limitative sense, with reference to the accompanying drawings in which:

FIG. 2a is a front and side perspective view of a jigsaw drive shaft and blade clamp of a first embodiment of the present invention;

FIG. 2b is a rear and side perspective view of the jigsaw blade clamp and drive shaft of FIG. 2a;

FIG. 2c is a front perspective view of the jigsaw drive shaft and blade clamp of FIG. 2a;

FIG. 4b is a front view of the blade clamp body of FIG. 4a;

FIG. 4c is a side view of the blade clamp body of FIG. 4a;

FIG. 4d is a rear view of the blade clamp body of FIG. 4a;

FIG. 9b is a side view of the cam body of FIG. 9a;

FIG. 9c is a bottom view of the cam body of FIG. 9a;

FIG. 9d is a front view of the cam body of FIG. 9a;

FIG. 10b is a side view of the cam body of FIG. 10a;

FIG. 10c is a bottom view of the cam body of FIG. 10a;

FIG. 10d is a front view of the cam body of FIG. 10a;

FIG. 12a is a side view of a first spring for use with the embodiment of FIGS. 9 to 11;

FIG. 12b is a front view of the spring of FIG. 12a;

FIG. 13b is a front view of the spring of FIG. 13a; and

DETAILED DESCRIPTION OF THE INVENTION

Figure 1:
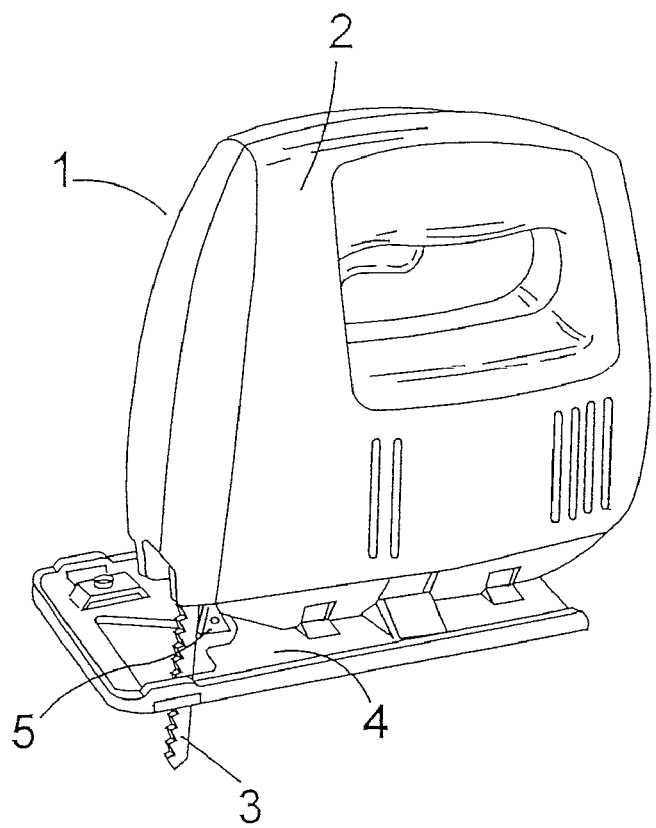
FIG. 1 is a perspective side view of a jigsaw.

Referring to FIG. 1, a jigsaw shown generally by 1 has a housing 2 of durable plastics material, with a motor (not shown) disposed therein. The motor has a rotary output shaft (not shown) geared to a drive mechanism which converts the rotary output of the motor into vertical reciprocating motion of a drive shaft (not shown). The housing 2 is mounted on a shoe 4 which rests on a workpiece and provides a reaction force for the blade 3 during upward movement thereof. The blade 3 is attached to the drive shaft (not shown) by a blade clamp 5.

Figure 3:
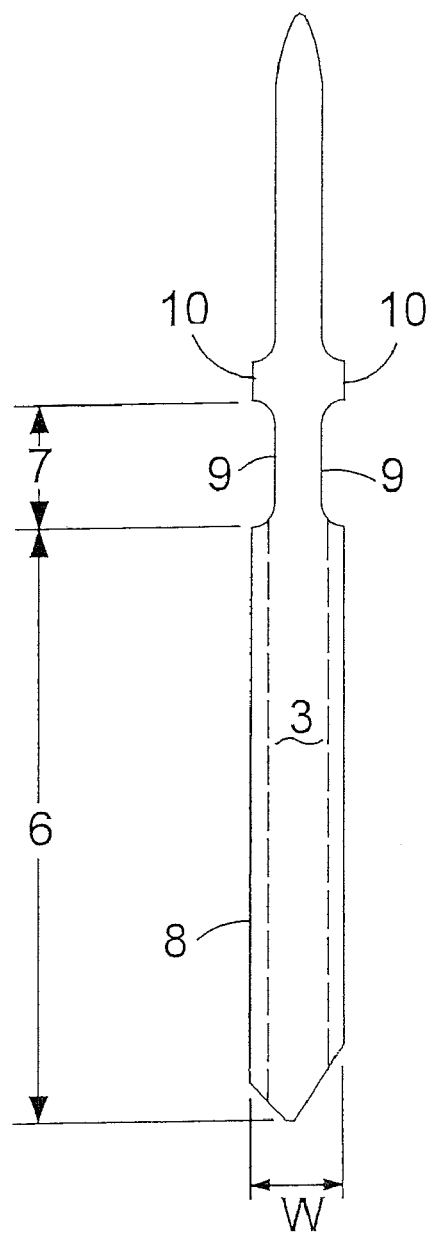
FIG. 3 is a side view of a blade to be used with the blade clamp of FIG. 2.

Referring now to FIG. 3, a blade to be used with the present invention will now be described. The blade shown generally by 3 has a cutting portion 8 of length defined by 6 and width defined by W. As will be appreciated by persons skilled in the art, one edge of the blade is provided with cutting teeth (not shown). At the upper end of the cutting portion 8 the width of the blade is reduced at a portion of the blade defined by 7, to form two indents 9. Above the indents 9 is a portion of the upper part of the blade as shown by 10 which has width less than W.

Figure 2C:
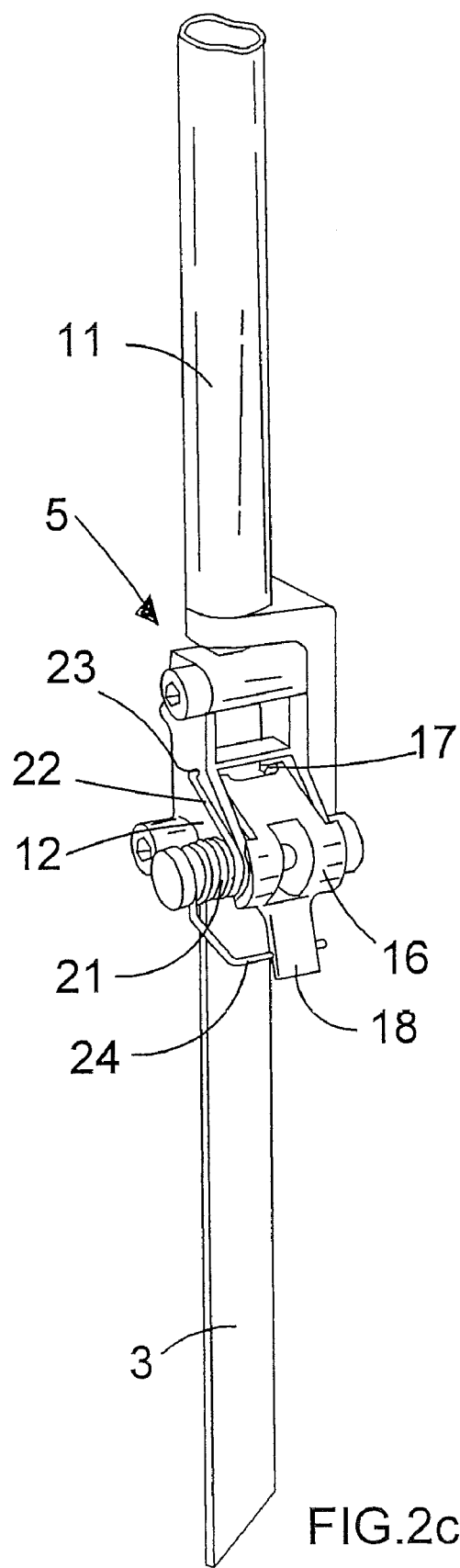

Referring now to FIGS. 2a to 2c, the jigsaw drive shaft 11 is connected to the blade 3 by a jigsaw blade clamp 5 embodying the present invention. Referring also to FIGS. 4a to 4d, the jigsaw blade clamp comprises a blade clamp body 12 which is mounted securely to the drive shaft 11 by means of a bracket 13. The blade clamp body 12 has a hollow interior 14 formed to receive the upper portion 7 of the jigsaw blade (FIG. 3). This is shown best in FIG. 6, in which the upper part of the blade 3 is received fully in the hollow portion 14. The blade clamp body 12 also includes a hollow tubular extension 15.

Figure 5:
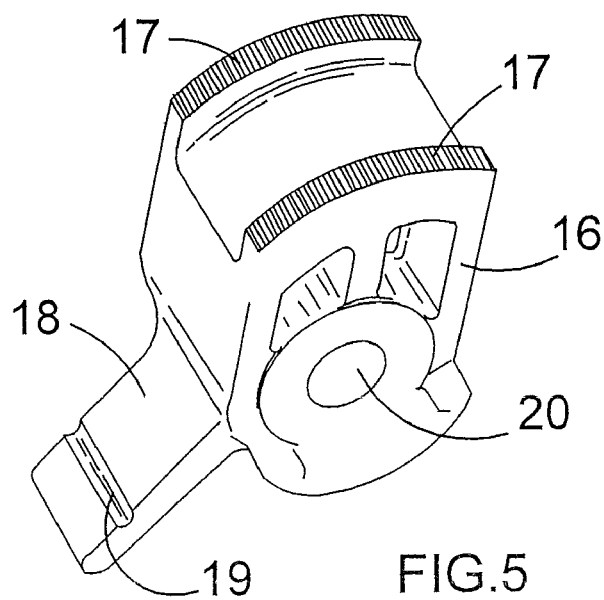
FIG. 5 is a perspective view of a cam body of the blade clamp of FIG. 2.

Referring to FIG. 5, a cam body 16 for cooperating with the clamp body 12 is shown. The cam body 16 comprises two cam surfaces 17 and an elongate protrusion 18. An indentation 19 is formed on the protrusion 18, the purpose of which will be described in greater detail below. The cam body 16 also comprises a cylindrical bore 20. The cam body 16 is formed such that it can be inserted into the hollow portion 14 of the clamp body 12. This is shown best in FIGS. 2a and 2c. When the cam body 16 is fully received in the clamp body 12 the cylindrical bore 20 of the cam body 16 is aligned with the hollow tubular extension 15 of the clamp body 12. A pin (not shown) is inserted such that it passes through the hollow tubular extension 15, and through the cylindrical bore 20, to enable the cam body 16 to be pivoted relative to the clamp body 12. A torsional spring 21 is mounted co axially on tubular extension 15. A first end 22 of the torsional spring 21 is securely received in a slot 23 formed in the clamp body 12. A second end 24 of the spring 21 rests in the indentation 19 formed in the protrusion 18 of the cam body 16.

The operation of the jigsaw blade clamp will now be described.

Figure 7:
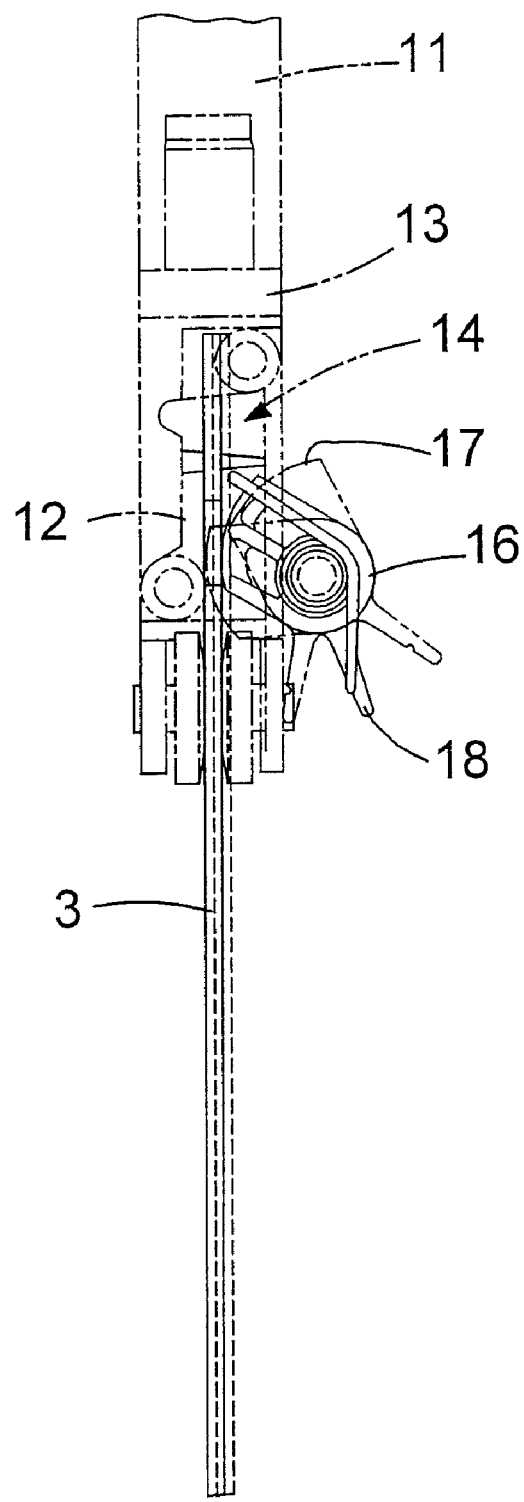
FIG. 7 is a front view of the blade and blade clamp of FIG. 2.

Referring to FIG. 7, the cam body 16 is able to pivot about an axis through the cylindrical bore 20 such that the cam surfaces 17 move in and out of contact with the rear surface of the hollow portion 14 of the clamp body 12. By virtue of the resilient action of spring 21, the cam body 16 is urged into the clamp body 12. In order to pivot the cam surfaces 17 away from the clamp body 12, the user must press on protrusion 18 in the direction of the blade such that the cam body 16 is pivoted out of clamp body 12 against the action of spring 21.

Figure 6:
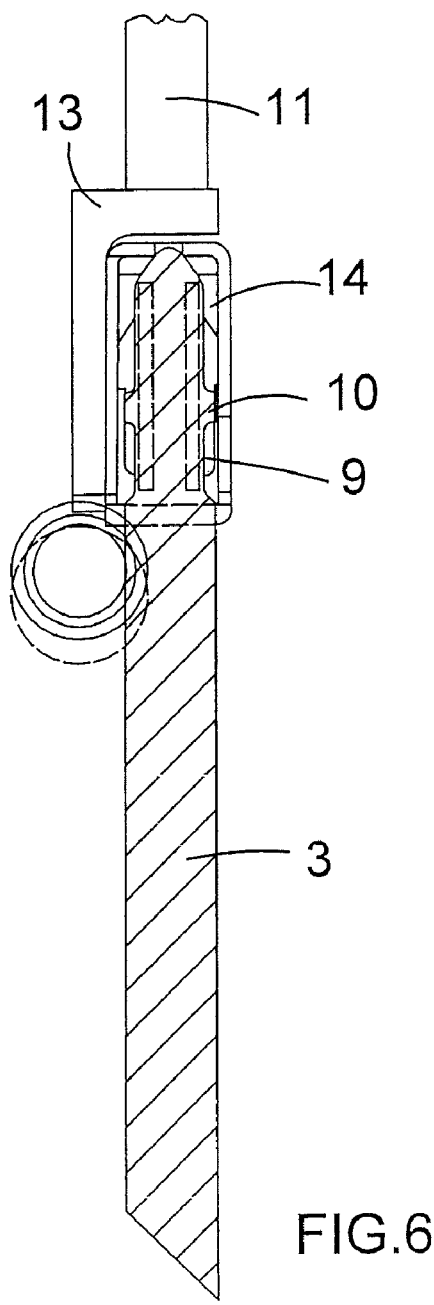
FIG. 6 is a side cross sectional view of the blade of FIG. 3 mounted to the blade clamp body of FIG. 4.
Figure 4A:
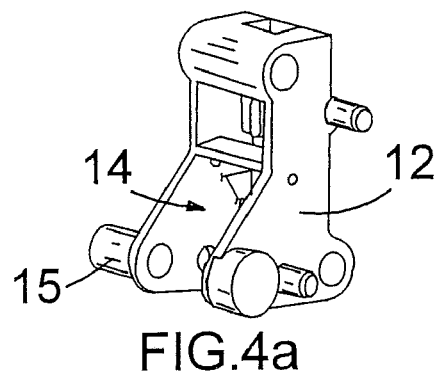
FIG. 4a is a sideways perspective view of a body of the blade clamp of FIG. 2.
Figure 4B:
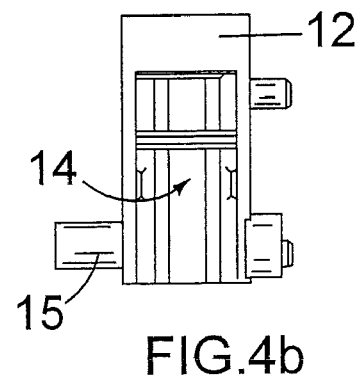
Figure 4C:
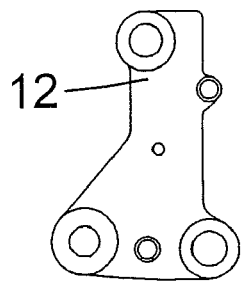
Figure 4D:
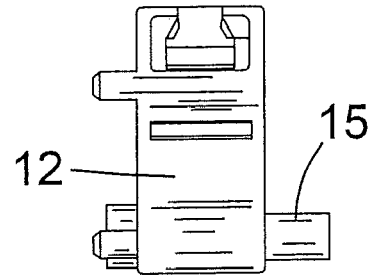

When a blade is mounted in the hollow portion of the clamp body 12, as shown in FIG. 6, the cam surfaces 17 engage indents 9 of blade 3. The blade 3 is prevented from slipping out of the clamp body 12 as the cam surfaces 17 are received in indents 9 and therefore are in contact with the protrusions 10 of the blade 3. If the blade 3 is pulled in a downward direction, the force exerted on cam surfaces 17 by projections 10 causes the cam surfaces 17 to be pivoted into further engagement with the blade 3, thereby tightening the grip of the blade clamp 5 on the blade 3.

Figure 8:
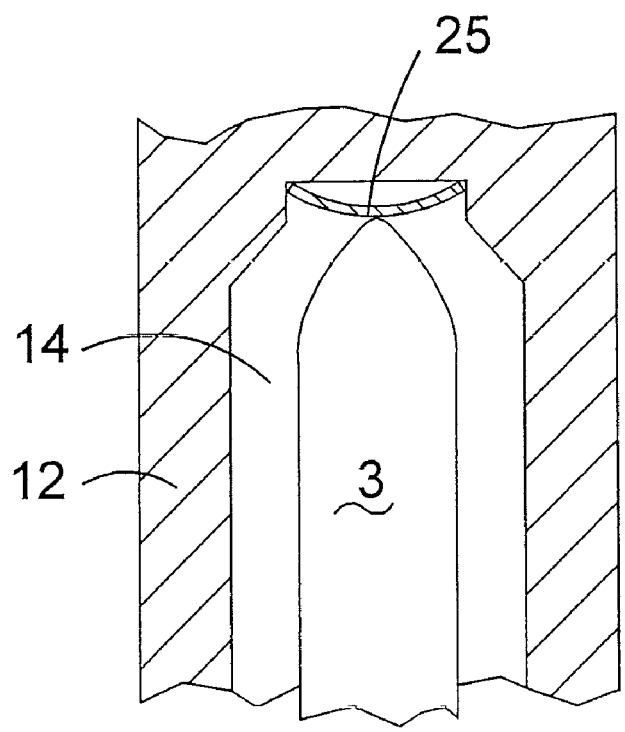
FIG. 8 is a cross sectional view of the upper part of the blade of FIG. 3 received in the blade clamp of FIG. 2.
Figure 9A:
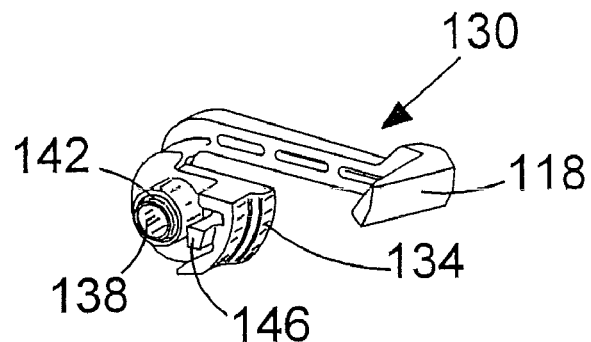
FIG. 9a is a side perspective view of a first part of a cam body of a second embodiment of the invention.
Figure 9B:
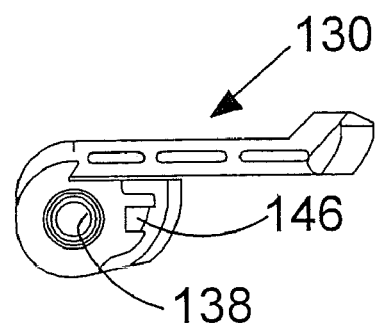
Figure 9C:
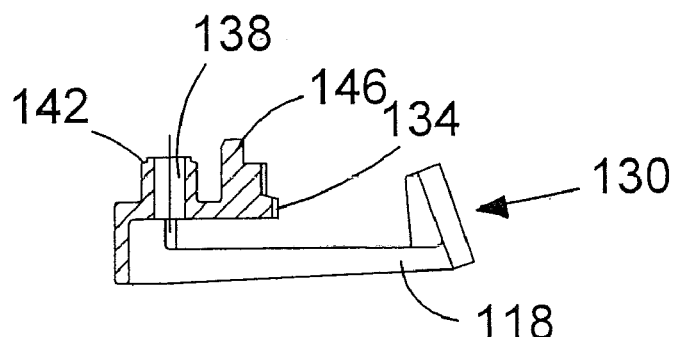
Figure 9D:
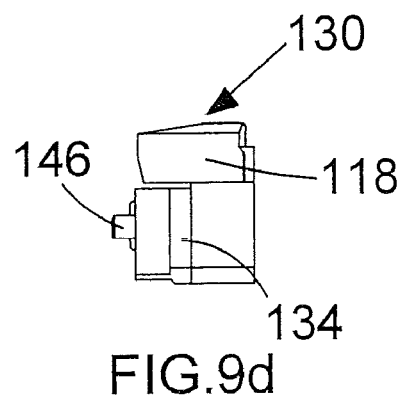
Figure 10A:
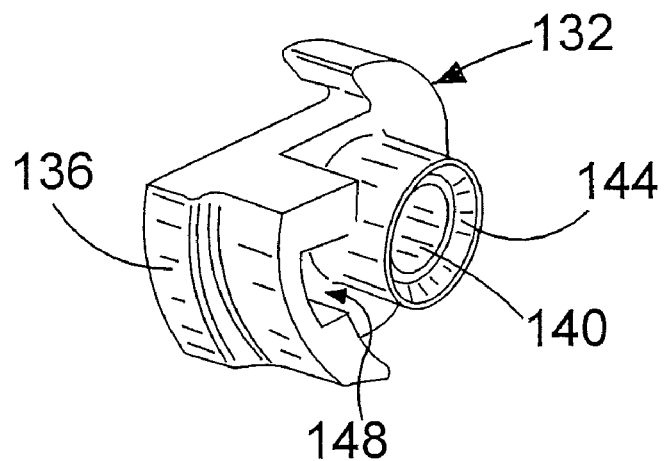
FIG. 10a is a side perspective view of a second part of the cam body of the embodiment of FIG. 9.
Figure 10B:
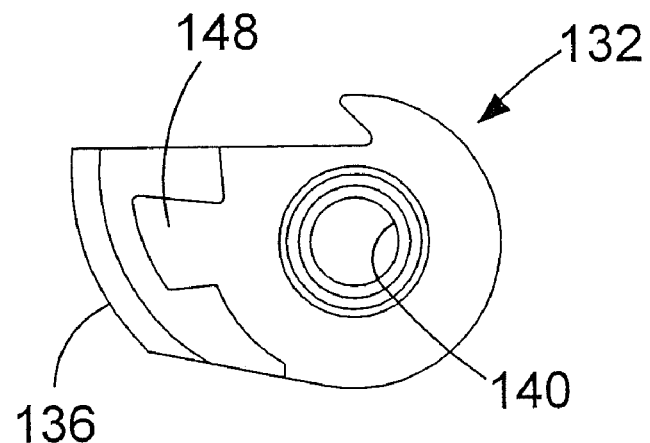
Figure 10C:
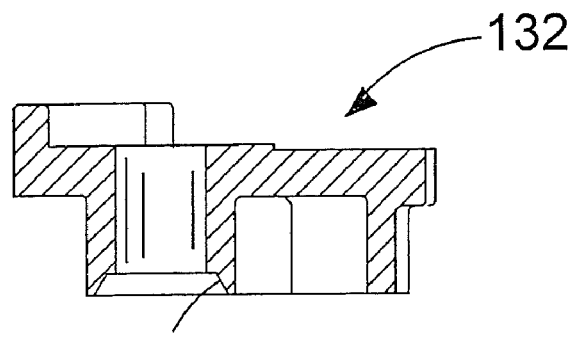
Figure 10D:
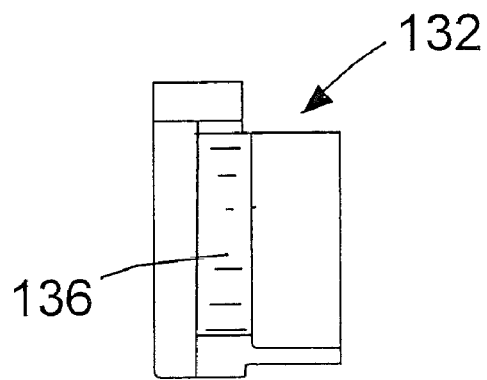

In order to effect the release of the blade 3 from the blade clamp 5, the cam body 16 is pivoted out of clamp body 12 by pressing on protrusion 18, such that the cam surfaces 17 move out of engagement with indentations 9 of the blade 3. Referring to FIG. 8, which shows the top of blade 3 engaged in the clamp body 12, a leaf spring 25 contacts the top edge of the blade 3, such that when the clamp 5 is opened the compressed leaf spring 25 extends, thus pushing the blade 3 out of engagement with clamp body 12. This not only facilitates removal of the blade from the clamp 5, but also ensures the blade 3 is correctly engaged with clamp 5 until the protrusion 18 is pressed.

Referring now to FIGS. 9 to 14, a second embodiment of the present invention is shown with parts common to the embodiment of FIGS. 1 to 8 denoted by like reference numerals but increased by 100.

Referring to FIGS. 9a to 9d, the cam body of this embodiment is formed from two separate parts. A first cam body part 130 is formed from durable plastics material. The first cam body part 130 comprises a first cam surface 134 for engaging a blade indent 9 of the blade 3 in the same way as the cam surfaces 17 engage the blade of the embodiment of FIGS. 1 to 8. An elongate protrusion 118 extends from the first cam body part 130 and is provided to enable a user to easily pivot the cam body part 130. The first cam body part 130 has a first cylindrical bore 138 for receiving a pin (not shown) to enable the cam body part 130 to be pivoted about an axis through the bore 138. A ridge 142 is formed around the circumference of cylindrical bore 138, the purpose of which will be described below. A peg 146 is also formed integrally with the first cam body part 130, the purpose of which will also be described below.

Referring now to FIGS. 10a to 10d, the second cam body part 132 comprises a second cam surface 136 for engagement with an indent 9 of blade 3. A second cylindrical bore 140 is formed with a circular recess 144 adapted to receive ridge 142 of the first cam body part 130, such that when the first and second cam body parts 130, 132 are mounted to each other, the first and second cylindrical bores 138, 140 form a continuous single cylindrical bore with a common axis. The second cam body part 132 is also provided with an aperture 148 in which peg 146 is received when the first and second cam body parts 130, 132 are attached to one another.

The first and second cam body parts 130, 132 are adapted to be mounted on a pin 150 (FIG. 14) such that the pin 150 passes through first and second cylindrical bores 138, 140 and each cam body part 130, 132 is independently pivotable to a limited extent about the pin 150.

Figure 11:
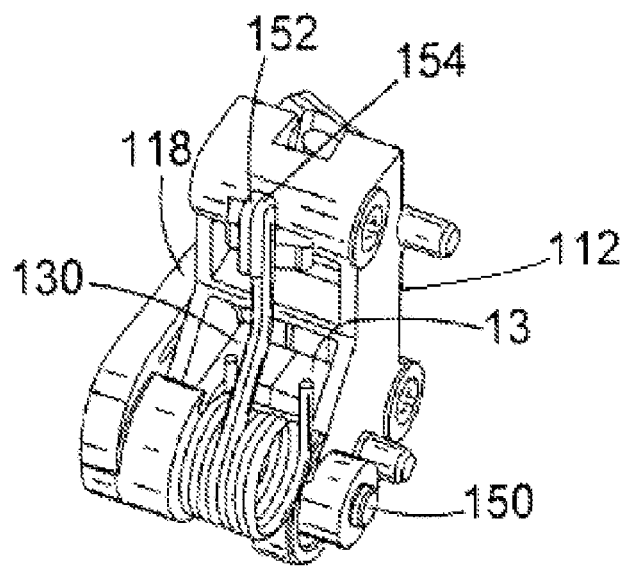
FIG. 11 is a partially cut away side perspective view of the first cam part of FIG. 9 and the second cam part of FIG. 10 mounted in the clamp body of FIG. 4.
Figures 12A, 12B:
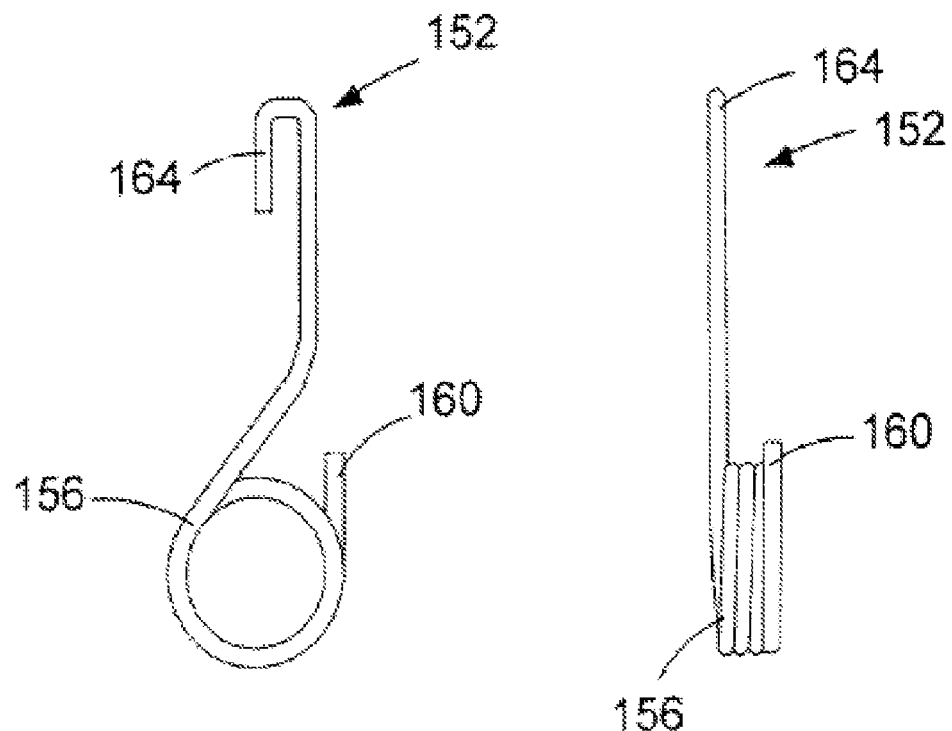
Figure 13A:
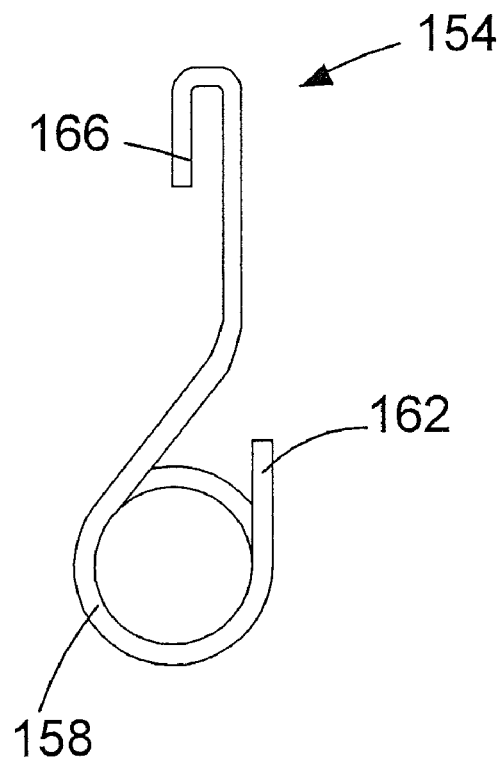
FIG. 13a is a side view of a second spring for use with the embodiment of the FIGS. 9 to 11.
Figure 13B:
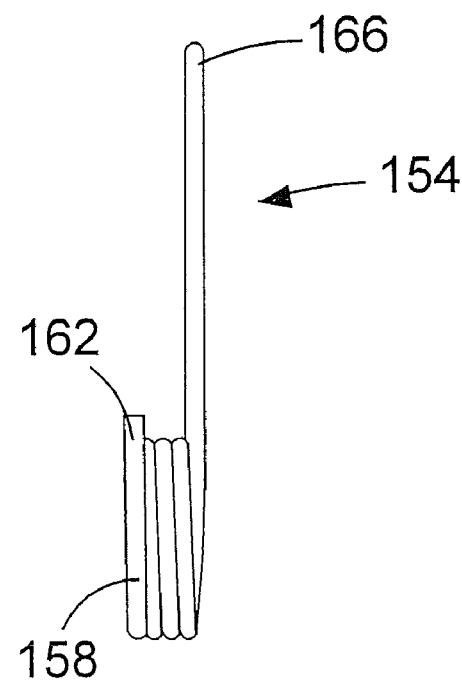
Figure 14:
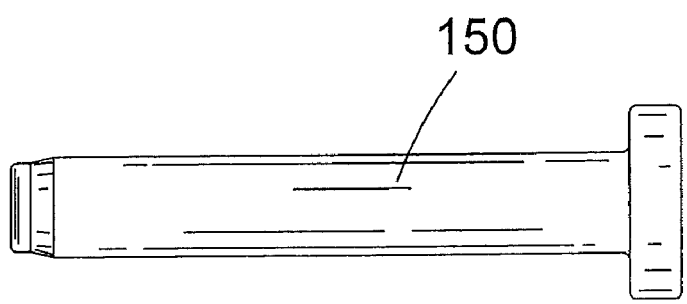
FIG. 14 is a side view of a cam body pin of the embodiment of FIGS. 9 to 13.

Referring to FIG. 11, the first and second cam body parts 130, 132 are shown mounted in a blade clamp body 112. The blade clamp body 112 is identical to the blade clamp body 12 from the first embodiment of the invention. Coil springs 152, 154 (FIGS. 12 and 13) are mounted on the cylindrical bore portions 138, 140 of the cam body parts 130, 132 respectively such that the coiled portions 156, 158 of the springs are coaxial with the cylindrical bore of the assembly. Each coil spring has a first end 160, 162 which is secured to the respective cam body part 130, 132 and a second end 164, 166 secured to the blade clamp body 112.

The operation of the jigsaw blade clamp of FIGS. 9 to 14 will now be described.

Referring to FIG. 11, in order to release a blade from the blade clamp, the user depresses elongate protrusion 118 to pivot first cam body part 130 about pin 150. This moves the first cam surface 134 out of engagement with the indentation 9 of blade 3. At the same time, peg 146 moves in the aperture 148 of the second cam body part 132 until the first cam body part 130 has moved sufficiently about the axis such that the peg 146 abuts the edge of the aperture 148. Further depression of elongate protrusion 118 then also causes second cam body part 132 to pivot about pin 150, thus moving the second cam surface 136 out of engagement with the other indentation 9 of blade 3. When the elongate protrusion 118 has been fully compressed, the blade is released.

As the peg 146 has a limited amount of travel in aperture 148, each cam body part 130, 132 is independently pivotable to a limited extent about the pin 150. However the user only has to move the first cam body part 130 in order to effect eventual movement of the second cam body part 132. Independent movement of the first and second cam body parts 130, 132 will therefore absorb any manufacturing tolerances in the cam surfaces themselves or the indentations of the blades.

It will be appreciated by persons skilled in the art that the above embodiments have been described by way of example only and not in any limitative sense, and various alterations and modifications are possible without departure from the scope of the invention as defined by the appended claims.

The invention claimed is:

1. A clamp assembly for removably mounting a working member of a reciprocating tool to a reciprocating output shaft, the reciprocating output shaft reciprocating along an axis of reciprocation, the working member including a pair of opposing indents along a longitudinal axis thereof and a pair of opposing protrusions along the longitudinal axis, one of the protrusions adjacent to each of the indents, the assembly comprising:

a body member adapted to be mounted to the output shaft;
   at least one engaging member having a first engaging portion and a second engaging portion, each respective engaging portion adapted to be received in each of the indents, wherein the engaging member is pivotable in use relative to the body member between a first position, in which the pair of engaging portions are disposed proximate the axis of reciprocation and engage the pair of indents to retain the working member in position on the output shaft, and a second position in which the engaging portions are spaced away from the axis of reciprocation relative to the first position and the working member is removable from the output shaft; and
   a first biasing member for urging the engaging member towards the first position; and
   wherein, when the engaging member is in the first position, upon application of a force to the working member tending to remove the working member from the body member, the engaging member prevents movement of the working member by the pair of engaging portions engaging the pair of protrusions; and
   wherein the first engaging portion and the second engaging portion are interconnected so as to permit limited relative rotational movement therebetween as they pivot from the second position to the first position; and
   wherein one of the first and second engaging portions includes a protrusion and the other of the first and second engaging portions includes a corresponding recess for receiving the protrusion, wherein the recess permits limited pivotal movement of the protrusion therein.

2. An assembly according to claim 1, wherein the first engaging portion is capable of limited pivotal movement relative to the second engaging portion about a common axis.

3. An assembly according to claim 1, wherein at least one engaging member further comprises at least one elongate protrusion adapted to enable the user to pivot the at least one engaging member towards the second position.

4. An assembly according to claim 3, wherein the at least one elongate protrusion is formed on a corresponding one of the at least one engaging member.

5. An assembly according to claim 3, wherein the first biasing means comprises at least one torsional spring adapted to engage the at least one elongate protrusion and the body member.

6. An assembly according to claim 1, wherein at least one of the engaging portions comprises a respective cam surface for engaging the working member and wherein application of a force to the working member so as to remove the working member from the output shaft urges at the least one the cam surface further into engagement with the working member.

7. An assembly according to claim 1, wherein each the at least one engaging member is adapted to be displaced from the first position thereof by movement of the working member away from the output shaft to enable mounting of the working member to the assembly by such movement thereof.

8. A reciprocating tool using a replaceable working member, the tool comprising:
a body;
a motor having a rotary shaft;
a drive mechanism for converting rotary movement of the rotary shaft to reciprocating movement of an output shaft, the reciprocating output shaft reciprocating along an axis of reciprocation; and
a clamp assembly for removably mounting the working member to the output shaft, the assembly comprising a body member adapted to be mounted to the output shaft, a first engaging member having a first engaging surface, a second engaging member having a second engaging surface, a protrusion extending from the first engagement member,
wherein the first and second engaging members are interconnected and independently pivotable in use relative to the body member between, a first position in which the first and second engaging surfaces are disposed against the body member proximate the axis of reciprocation to retain the working member in position on the output shaft and, a second position in which the first and second engaging surfaces are pivoted a distance away from the axis of reciprocation and the working member is removable from the output shaft; and
a first biasing member for urging the first engaging member towards the first position;
a second biasing member for urging the second engaging member towards the first position.
wherein the interconnection between the first and second members is such that application of a first force by a user to the protrusion is capable of pivoting the first and second engaging members toward the second position against the forces of first and second biasing members; and
wherein after initial rotation by the protrusion toward the second position, the first engagement member includes an extension that contacts a portion of the second engagement member to cause the second engagement member to begin pivoting toward the second position.

9. A tool according to claim 8, further including a third biasing means for urging the working member out of engagement with the output shaft and body member.

10. A tool according to claim 8, wherein the tool is a jigsaw.

11. A tool according to claim 8, wherein an initial rotation of the protrusion results in a pivoting of the first engagement member and not the second engagement member.

12. A tool according to claim 8, wherein contact between the first engaging surface or the second engaging surface and the body member prevents removal of the working member from the body member.

13. A jig saw comprising:
a housing;
a motor having a rotary output shaft;
a reciprocating drive shaft;
a transmission connected between the rotary output shaft and the reciprocating drive shaft and converting the rotation of the motor output shaft into reciprocating movement of the drive shaft;
a removable saw blade including a cutting portion and a shank, the shank including an engaging extension and defining first and second slots between the engaging extension and the cutting portion; and
a blade clamping assembly, the blade clamping assembly including: a body member connected to the drive shaft; a first cam body pivotally connected to the body member and including a first engaging portion, the first cam body pivotable between a first position and a second position;
a second cam body pivotally connected to the body member and coaxial with the first cam body, the second cam body including a second engaging portion, the second cam body pivotable between a first and a second position;
a first spring for biasing the first cam body into the first position;
a second spring for biasing the second cam body into the first position; and
wherein when the first cam body and the second cam body are in the first position, then the first engaging portion extends into the saw blade shank first slot and the second engaging portion extends into the saw blade shank second slot to retain the saw blade in the blade clamp assembly, and when in the second position then the first engaging portion is retracted from the first slot and the second engaging portion is retracted from the second slot so that the saw blade is removable from the blade clamp assembly, and
wherein the first cam body and second cam body are interconnected so as to permit limited rotational movement between the first cam body and the second cam body as they pivot from the second position to the first position.

14. A jig saw according to claim 13, wherein the cam body engaging portion is a cam shaped surface.

15. A jig saw according to claim 13 wherein the first cam body includes a protruding lever for pivoting the first cam body and the second cam body from the first position to the second position against the biasing forces of the first spring and the second spring, for the purpose of removing the saw blade from the blade clamp assembly.

16. A jig saw according to claim 13 and further comprising a biasing member for urging the saw blade out of the blade clamp assembly.

* * * * *